(12) United States Patent
Sako

(10) Patent No.: US 7,170,532 B2
(45) Date of Patent: Jan. 30, 2007

(54) IMAGE DISPLAY METHOD, APPARATUS, PROGRAM AND STORAGE MEDIUM

(75) Inventor: Tsukasa Sako, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 10/714,641

(22) Filed: Nov. 18, 2003

(65) Prior Publication Data

US 2004/0109008 A1 Jun. 10, 2004

(30) Foreign Application Priority Data

Nov. 21, 2002 (JP) ............................ 2002-337805

(51) Int. Cl.
*G09G 5/00* (2006.01)
*G06K 9/00* (2006.01)
(52) U.S. Cl. ..................... 345/637; 382/128
(58) Field of Classification Search ............... 345/619, 345/621, 629, 632, 633; 715/745
See application file for complete search history.

(56) References Cited

U.S. PATENT DOCUMENTS

| | | | | |
|---|---|---|---|---|
| 5,302,969 | A * | 4/1994 | Kuroda et al. ............... | 345/168 |
| 5,613,057 | A * | 3/1997 | Caravel .................... | 715/500.1 |
| 5,731,844 | A * | 3/1998 | Rauch et al. ................. | 725/40 |
| 5,779,634 | A | 7/1998 | Ema et al. .................. | 600/407 |
| 5,798,759 | A * | 8/1998 | Dahl ......................... | 715/745 |
| 5,805,118 | A * | 9/1998 | Mishra et al. ................ | 345/1.1 |
| 5,973,692 | A * | 10/1999 | Knowlton et al. .......... | 715/835 |
| 5,977,964 | A * | 11/1999 | Williams et al. ............ | 715/721 |
| 6,032,157 | A * | 2/2000 | Tamano et al. .......... | 707/104.1 |
| 6,348,878 | B1 * | 2/2002 | Tsubai ........................ | 341/23 |
| 6,462,759 | B1 * | 10/2002 | Kurtzberg et al. .......... | 715/803 |
| 6,727,909 | B1 * | 4/2004 | Matsumura et al. ........ | 345/629 |
| 6,831,752 | B1 * | 12/2004 | Matsuo ....................... | 358/1.13 |
| 6,862,102 | B1 * | 3/2005 | Meisner et al. ............ | 358/1.15 |
| 2002/0006218 | A1 | 1/2002 | Sako ........................... | 382/132 |
| 2002/0080918 | A1 | 6/2002 | Sako | |
| 2002/0180786 | A1 * | 12/2002 | Tanner ....................... | 345/745 |
| 2003/0142119 | A1 * | 7/2003 | Akagi ......................... | 345/698 |
| 2003/0151621 | A1 * | 8/2003 | McEvilly et al. ........... | 345/744 |
| 2004/0001087 | A1 * | 1/2004 | Warmus et al. ............. | 345/745 |

FOREIGN PATENT DOCUMENTS

JP 05-056953 3/1993

* cited by examiner

*Primary Examiner*—Ryan Yang
(74) *Attorney, Agent, or Firm*—Fitzpatrick, Cella, Harper & Scinto

(57) ABSTRACT

The invention facilitates a setting operation relating to the displaying and laying out of images and arranges it so that the layout will reflect the preferences of the observer. The invention provides a medical image display apparatus for displaying medial images and other medical data on a display unit. An image storage unit for storing medical images and a processor are connected to the display unit. A frequency-of-use storage unit and a mode storage unit are connected to the processor. When medical images have been displayed, the frequency-of-use storage unit stores the frequency of use of the layout type. The apparatus sets a display format of the medical images automatically based upon the frequency of use of this layout type. There is a good possibility that a layout type having a high frequency of use will reflect the preference of the reader (observer). If this layout type is used as is, or if the layout type is used after only a minor change, this will facilitate the setting operation relating to display layout.

18 Claims, 18 Drawing Sheets

DAY: MONTH: YEAR: EXAMINATION OF FRONT OF CHEST

801

F I G. 15

| EXAMINATION TYPE | EXAMINATION OF FRONT AND SIDE OF CHEST | | | | | | | |
|---|---|---|---|---|---|---|---|---|
| LAYOUT TYPE | POSITION 1 | POSITION 2 | POSITION 3 | POSITION 4 | FREQUENCY | READER | FREQUENCY RANK | FINAL USE |
| TWO IMAGES HORIZONTALLY | SIDE OF CHEST | FRONT OF CHEST | | | 10 TIMES | A 2 TIMES<br>B 8 TIMES | 2 | B |
| TWO IMAGES HORIZONTALLY | FRONT OF CHEST | SIDE OF CHEST | | | 12 TIMES | C 12 TIMES | 1 | C |
| TWO IMAGES VERTICALLY | FRONT OF CHEST | SIDE OF CHEST | | | 2 TIMES | A 2 TIMES | 4 | A ○ |
| ONE IMAGE | FRONT OF CHEST | | | | 3 TIMES | A 1 TIMES<br>B 1 TIMES<br>C 1 TIMES | 3 | |

IMAGE DISPLAY METHOD, APPARATUS, PROGRAM AND STORAGE MEDIUM

CLAIM OF PRIORITY

The present application claims priority under 35 U.S.C. S119 from Japanese Patent Application No. 2002-337805, entitled "An Image Display Method and Apparatus, A Computer Program, A Computer-Readable Recording Medium" and filed on Nov. 21, 2002, the entire contents of which are hereby incorporated by reference herein.

FIELD OF THE INVENTION

This invention relates to an image display method, apparatus, program and storage medium.

BACKGROUND OF THE INVENTION

Images for medical use include X-ray images for medical use, CT-scan images and MRI images. These conventional images are captured by a film-screen photographic apparatus.

When medical images are read and interpreted, the physician performs this operation upon hanging the film on a view box (a back-lit film hanging box). The order in which the images are hung is referred to as the "hanging format" and differs depending upon the institute, the examination particulars and the personal preference of the physician. The hanging format is very important in terms of achieving highly accurate diagnosis. The importance of the hanging format is widely recognized. At medical establishments in the USA, for example, a specially appointed worker is employed to hang the film.

In line with the international standard DICOM (Digital Information and Communication in Medicine) relating to the digitization of medical images, the MIPS (Medical Image Processing System) standard has been set up by the Japan Industrial Association of Radiological Systems (JIRA) in Japan, where the digitization of medical images is being forwarded.

Against this background, there has been developed an X-ray digital photography apparatus for detecting and generating medical X-ray images as digital data. For example, there is an X-ray photography apparatus that employs a solid-state image sensing device for outputting an analog signal conforming to the strength of detected X rays, and a flat sensor panel for obtaining digital data by subjecting the analog signal to an A/D conversion. This X-ray digital photography apparatus is smaller than the conventional photography apparatus and is capable of reducing the amount of radiation to which the patient is exposed. For these and other reasons, the apparatus is starting to be used more actively.

In an X-ray digital photography apparatus, medical images are recorded not on film but as digital data and the recorded digital data is displayed on a monitor. Often the display layout is set beforehand according to the type of examination. The setting operation is not only complicated but also does not provide much leeway for reflecting the preferences of the physician.

Accordingly, the specification of Japanese Patent Application Laid-Open No. 5-56953 proposes a display system in which medical images are displayed and laid out automatically for each type of examination based upon direction of photography and procedure.

In this conventional display system, however, it is necessary to set the display layout in advance and the setting operation is complicated.

SUMMARY OF THE INVENTION

Accordingly, an object of the present invention is to facilitate a setting operation relating to the displaying and laying out of medical and other images, and to so arrange it that the layout will reflect the preferences of the observer, such as the person (the user) reading the image.

According to the present invention, the foregoing object is attained by providing an image display method for displaying images of a prescribed combination in image layout formats of a plurality of types, comprising: a frequency storage step of storing frequency of use with respect to a prescribed format from among the image layout formats of the plurality of types; a setting step of setting the image layout format, which is used in displaying the prescribed combination of images, based upon the frequency of use that has been stored; and a display step of displaying the prescribed combination of images on a display in the image layout format that has been set.

Further, according to the present invention, the foregoing object is attained by providing an image display apparatus comprising: a display for displaying images; a processor for setting a layout of images on the display; and a frequency storage unit for storing frequency of use of a layout format of the images; wherein the processor sets a layout format of images based upon the frequency of use.

Further, according to the present invention, the above-described image display method is implemented also by a program for executing the method on a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 illustrates the frequency storage table;

DETAILED DESCRIPTION OF THE PREFERRED EMBODIMENTS

Reference will now be given to the drawings to describe embodiments in which an image display method, apparatus, program and storage medium according to the present invention are applied to medical images.

[First Embodiment]

Figure 1:
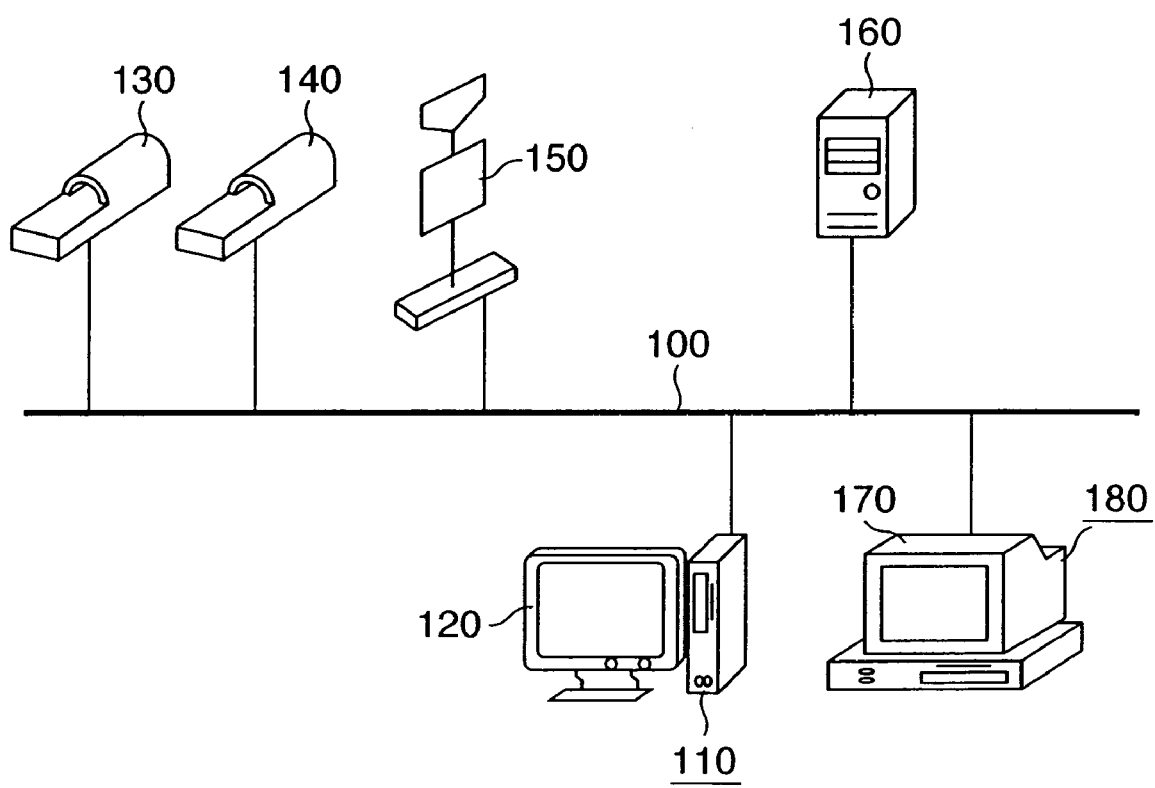
FIG. 1 is a diagram illustrating a first embodiment of a medical image display apparatus according to the present invention.

FIG. 1 is a diagram illustrating a first embodiment of a medical image display apparatus according to the present invention.

As shown in FIG. 1, a medical image display apparatus 110 is connected to medical image generating units 130, 140, 150 and a medical data server 160 via a local-area network (LAN) 100. The medical image generating units 130 and 140 are, e.g., a CT scan unit and an MRI unit, respectively, and the medical image generating unit 150 is, e.g., an X-ray photography unit.

Medical images generated by the medical image generating units 130, 140, 150 are transmitted to the medical image display apparatus 110 directly or upon being stored temporarily in the medical data server 160. Medical images that have been transmitted directly to the medical image display apparatus 110 are archived on a storage medium in the medical image display apparatus 110.

The medical image display apparatus 110 has a high-definition color liquid crystal monitor 120 that is capable of displaying a medical image at a high definition. A medical image display apparatus 180 having a monochrome monitor 170 also may be used.

The medical image display apparatus 110 displays the received medical images in response to a command from the reader (observer) (not shown) so that the reader (observer) may interpret the images.

Figure 2:
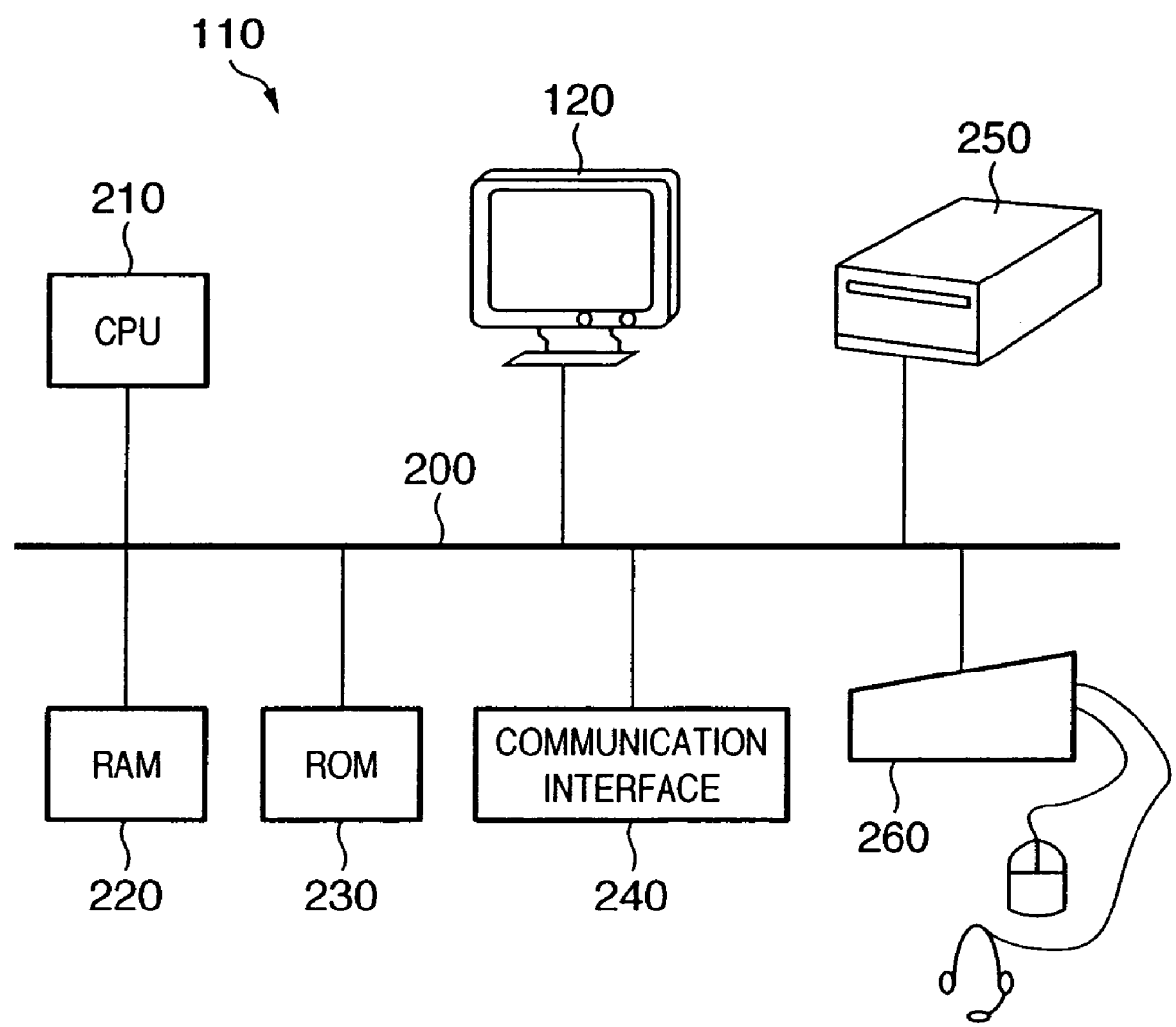
FIG. 2 is a block diagram illustrating the internal structure of the medical image display apparatus shown in FIG. 1.

FIG. 2 is a block diagram illustrating the internal structure of the medical image display apparatus shown in FIG. 1. As shown in FIG. 2, the medical image display apparatus 110 includes a CPU 210, a RAM 220, a ROM 230, a communication interface 240 and input means 260 connected to a bus 200. Output units such as the high-definition color liquid-crystal monitor 120 and a printer 250 are connected to the bus 200 via suitable interfaces. The input means include a keyboard, a pointing device and a microphone, etc.

The CPU 210 is used to control the overall medical image display apparatus 110 and to control the output units, and the control program thereof is stored in the ROM 230. The communication interface 240, which controls communication based upon the LAN 100, sends and receives medical images and other data to and from the medical image generating units 130, 140, 150 and medical data server 160 as appropriate.

Figure 3:
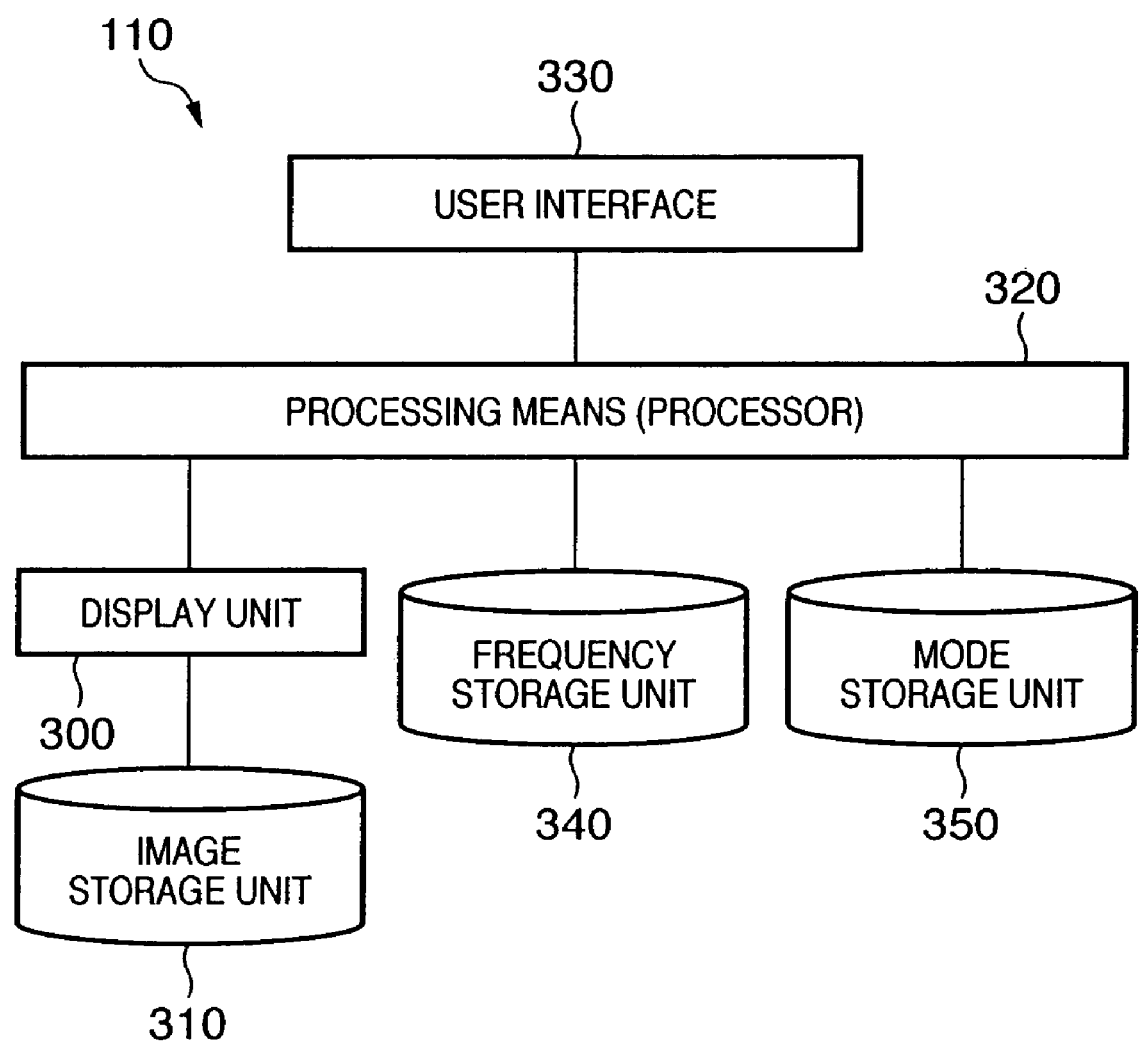
FIG. 3 is a functional block diagram illustrating the function of the medical image display apparatus shown in FIG. 2.

FIG. 3 is a functional block diagram illustrating the functions of the medical image display apparatus. As shown in FIG. 3, the medical image display apparatus 110 displays medical images and other medical data on a display unit 300 (which corresponds to the high-definition color liquid-crystal monitor 120 of FIG. 1). Connected to the display unit 300 are an image storage unit 310 (which corresponds to the server 160 in FIG. 1) for storing medical images, and processing means (processor) 320 (which corresponds to the CPU 210 in FIG. 2). Connected to the processing means (processor) 320 is a user interface 330, which the reader (observer) uses to control the processing means (processor) 320 to execute processing for commanding the display of medical images, for changing a display layout, etc. A frequency storage unit 340 and a mode storage unit 350 (both of which correspond to the server 160 in FIG. 1) are connected to the processing means (processor) 320. When medical images have been displayed, the frequency storage unit 340 stores the frequency (frequency of use) with which this type of layout has been displayed. (Type of layout refers to the combination of positions at which one or a plurality of images are displayed on the screen, e.g., two images arranged horizontally, two images arranged vertically, four images consisting of two images disposed above two other images, etc.). Furthermore, the position of each image is not fixed even in the same type of layout. For example, whether a certain image of two horizontally disposed images is to be placed at the left or right can be selected. A layout type in which the position of each image has been specified shall be referred to as a "record".

The timing at which the frequency of use is updated in the frequency storage unit 340 can be set in various ways, as indicated by (1) to (4) below.

(1) The timing can be that at which an image is displayed (this is a start mode).

(2) The timing can be that at which an image is displayed and that at which the image layout is changed. A change in image layout is the point in time at which an operation is performed to change the layout of images being displayed (this is a start/change mode).

(3) The timing can be that at which the display step ends. That is, this is the point in time at which the interpreting of a displayed image is finished (this is an end mode).

(4) The timing can be that at which the reader (observer) performs an operation to count the frequency of use of an image layout. That is, this is the point in time at which the reader (observer) performs a prescribed frequency counting operation, such as the clicking an on-screen button 507 (see FIG. 5) for storing the layout type (this is a designate mode).

These frequency update timings shall be referred to as "storage modes".

If management of frequency of use in the frequency storage unit 340 is performed for each individual reader (observer), the preferences of the reader (observer) can be reflected. However, it is also possible to store frequencies of use collectively without distinguishing a plurality of readers (observers) or all readers (observers) from each other. In this case, the storage capacity required of the frequency storage unit 340 can be reduced.

The mode storage unit 350 stores storage modes. For example, the types of storage modes [the above-mentioned modes (1) to (4) according to this embodiment] and the type of mode currently selected are stored in the mode storage unit 350. In addition, it may be so arranged that a history of modes selected in the past is stored in the mode storage unit 350.

The medical image display apparatus 110 sets the display layout of medical images automatically based upon the frequency of use the layout type. There is a good possibility that a layout type having a high frequency of use will reflect the preference of the reader (observer). If this layout type is used as is, or if the layout type is decided only by a minor change, this will facilitate the setting operation relating to display layout.

Figure 4:
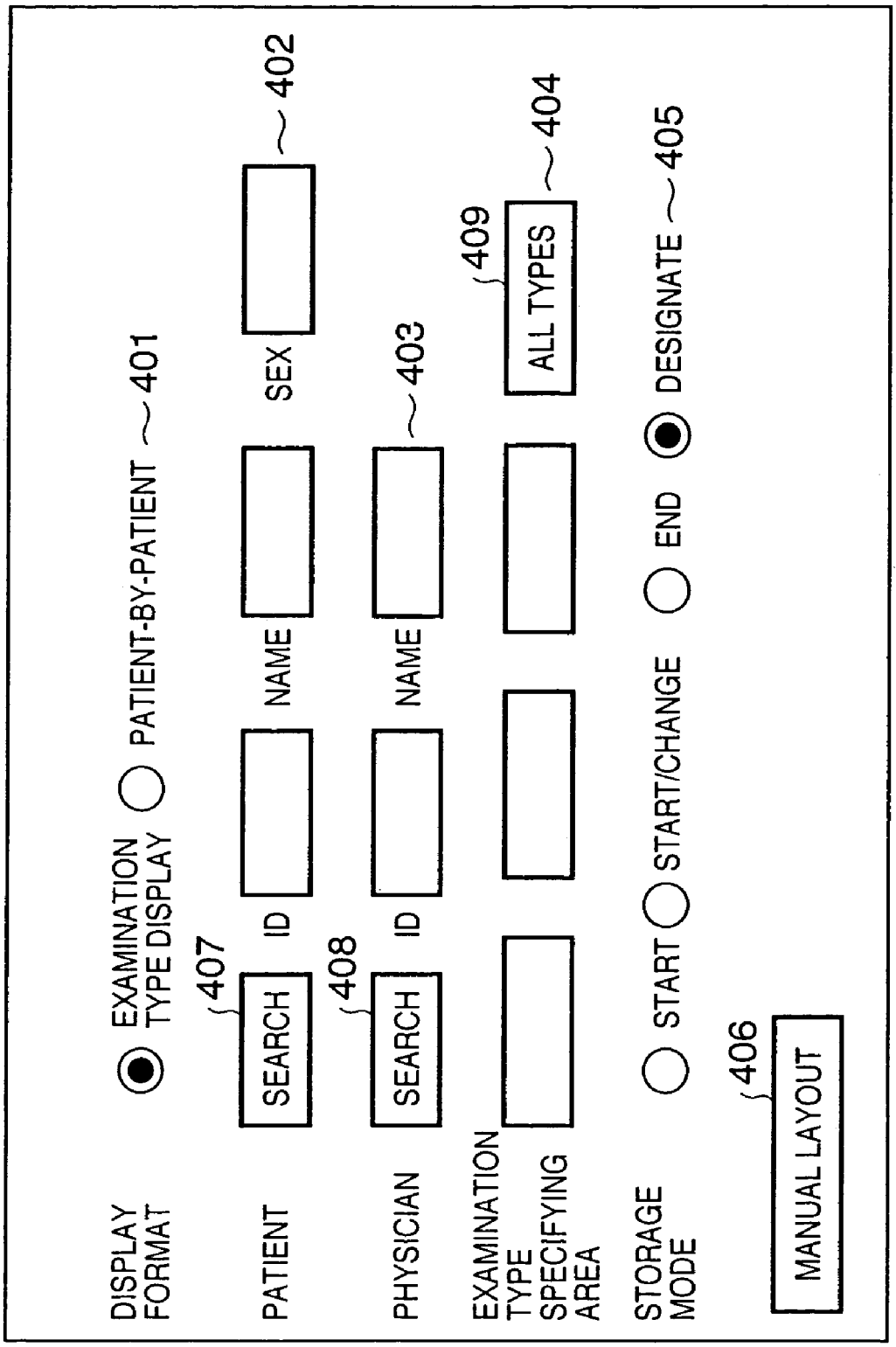
FIG. 4 is a front view illustrating a display setting screen in the medical image display apparatus shown in FIG. 2.

FIG. 4 is a front view illustrating a display setting screen in the medical image display apparatus of FIG. 2. The display setting screen shown in FIG. 4 makes it possible for various settings relating to display of medical images to be performed using the medical image display apparatus 110. It should be noted that since initial values have been set beforehand on the display setting screen, a transition can be made to display of medical images without making any inputs.

The display setting screen is provided with a display format selecting area 401, a patient specifying area 402, a physician specifying area 403, an examination type specifying area 404, a storage mode specifying area 405 and a manual layout button 406.

The display format selecting area 401 is used to select whether medical images are to be displayed per identical examination (this is an examination type display) or on a per-patient basis (this is a patient-by-patient display). With the patient-by-patient display, medical images of a plurality of different examinations regarding one patient can be displayed. The initial display is the examination type display.

The patient specifying area 402 is provided with boxes in which it is possible to enter patient ID, name and sex. A patient can be specified by making entries in these boxes. If a partial entry is made with regard to any of the patient ID, name and sex and a search button 407 is clicked, relevant patient names will be displayed. A patient can be specified from these search results.

The physician specifying area 403 is provided with boxes in which physician ID and name can be entered. A physician can be specified by making entries in these boxes. If a partial entry is made with regard to physician ID or name and a search button 408 is clicked, relevant physician names will be displayed. A physician can be specified from these search results.

The examination type specifying area 404 is provided with a plurality of boxes in which types of examination can be entered. A type of examination can be specified by making entries in these boxes. Each box is capable of displaying a list of examination types as by a pull-down menu, and an examination type can be selected from the list. Furthermore, an all-types button 409 for specifying all types of examinations is provided.

The storage mode specifying area 405 makes it possible to select any one of a start mode, start/change mode, end mode and designate mode by using radio buttons or the like.

In the start mode, the frequency of use of an image-layout record prevailing at the moment display of medical images starts is counted.

In the start/change mode, the frequency of use of an image-layout record is counted at the moment the above-mentioned images are displayed and at the moment an operation is performed to change the layout of images being displayed.

In the end mode, the frequency of use of an image-layout record is counted at the moment the display of images currently being displayed is terminated.

In the designate mode, the frequency of use of an image-layout record is counted at the moment the reader (observer) performs an operation to count the frequency of use of an image layout, i.e., at the moment the reader (observer) performs a prescribed frequency counting operation such as the clicking of an on-screen button.

The manual layout button 406 makes it possible for the reader (observer) to define a new layout type.

Figure 5:
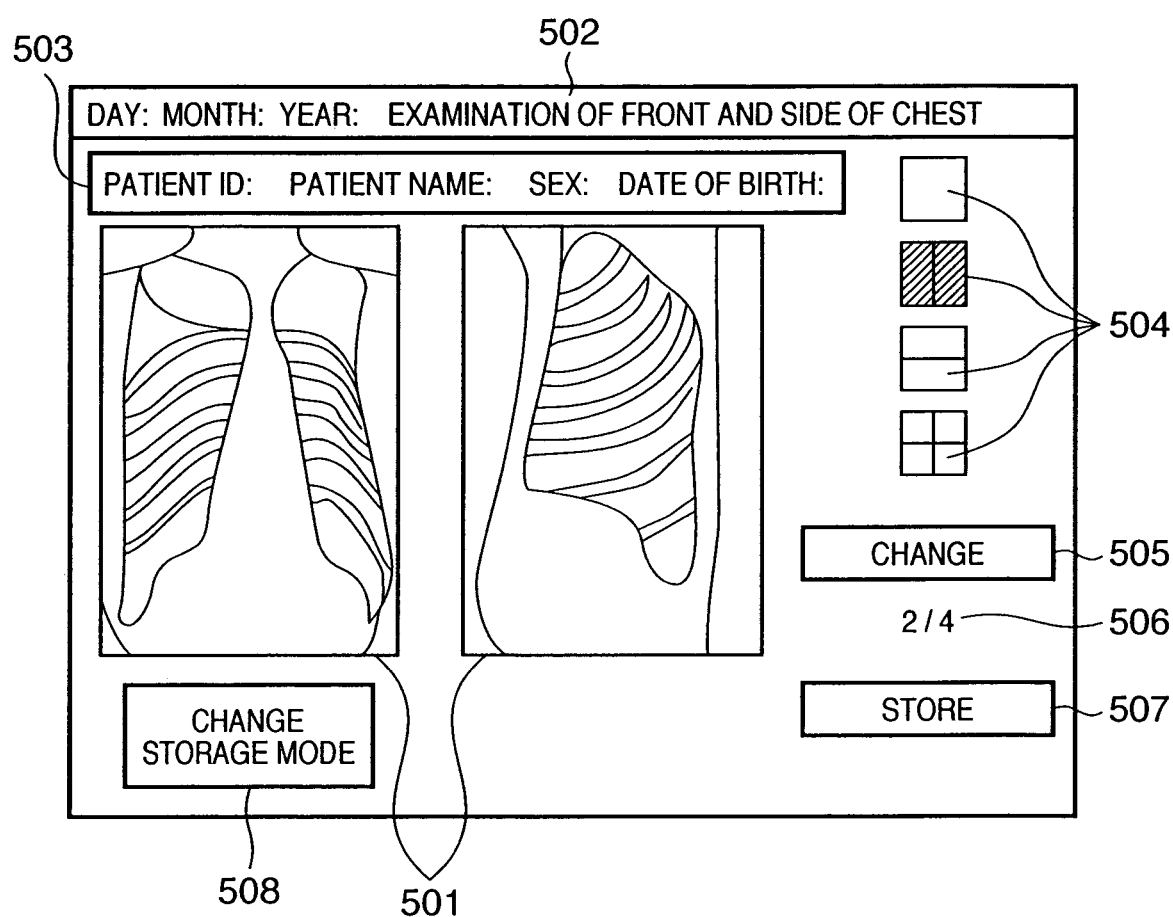
FIG. 5 is a front view illustrating an examination-type display screen in the medical image display apparatus shown in FIG. 2.

FIG. 5 is a front view illustrating a screen for displaying type of examination in the medical image display apparatus of FIG. 2. In the display of examination type shown in FIG. 5, the following are displayed on the screen: medical images 501, an indication 502 of examination date and type, a patient indication 503, layout-type change buttons 504, a priority change button 505, a priority confirmation area 506, a layout-type store button 507 and a storage-mode change button 508.

The medical images 501 are displayed in a number and layout set by the layout-type change buttons 504. Two images have been laid out horizontally on the screen in FIG. 5.

The indication 502 of examination date and type presents a display of the date on which the medical images 501 were generated as well as of the type of examination. The type of examination relating to the medical images 501 in FIG. 5 is an examination of the front and side of the chest. Since the display of examination type is a display of medical images pertaining to one and the same examination, the indication 502 of examination date and type is displayed at the uppermost part of the screen.

The patient indication 503 displays the patient ID, patient name, sex and date of birth. This information is based upon the DICOM standard.

The layout-type change buttons 504 display buttons having a rectangular shape, a rectangular shape split vertically into two halves, a rectangular shape split horizontally into two halves and a rectangular shape split into four quadrants. These are for selecting layout types for one image, two images disposed horizontally, two images disposed vertically and four images, respectively. In FIG. 5, the button having the rectangular shape split vertically into two halves is highlighted to indicate that the layout type for two horizontally disposed images has been selected.

The priority change button 505 is a button which, when the storage mode is the designate mode, makes it possible to set the frequency of use of the layout type to be selected. The priority confirmation area 506 displays the set frequency for confirmation purposes. In FIG. 5, the fact that the layout type of the second frequency of use is selected from among the four levels of frequency is indicated by a "2/4" display. By virtue of this display, the fact that the highlighted horizontal two-image display has the second highest frequency of use can readily be ascertained by the user.

The arrangement is such that if the priority is changed by the priority change button 505, this change is accompanied by a change in the layout type indicated among the buttons 504. In other words, the priority change button 505 is linked to the layout-type change buttons 504. For example, if the "2/4" indication currently being displayed is changed to "3/4" (selection of the layout type having the third highest frequency of use), then the highlighted layout type among the layout-type change buttons 504 also changes in operative association with the above change. Accordingly, the reader (observer) can select the layout type using any of the layout-type change buttons 504 and the priority change button 505.

The layout-type store button 507 is for designating that the layout type of the medical images currently being displayed is to be added to the frequency of use.

The storage-mode change button 508 is a button for changing the storage mode.

Figure 6:
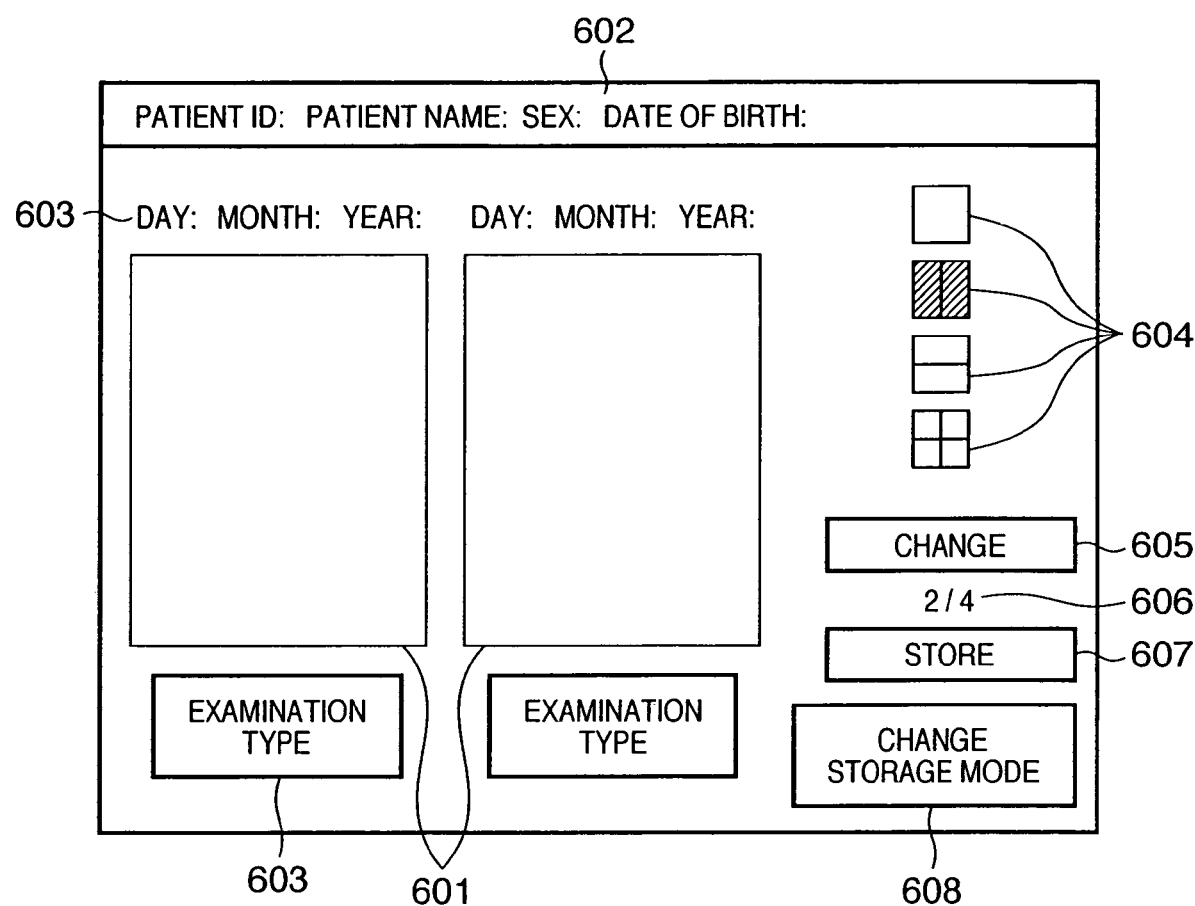
FIG. 6 is a front view illustrating a patient-by-patient display screen in the medical image display apparatus shown in FIG. 2.

FIG. 6 is a front view illustrating a patient-by-patient display screen in the medical image display apparatus shown in FIG. 2. The patient-by-patient display in FIG. 6 displays the following on the screen: medical images 601, a patient indication 602, an indication 603 of examination date and examination type, layout-type change buttons 604, a priority change button 605, a priority confirmation area 606, a layout-type store button 607 and a storage-mode change button 608.

In the patient-by-patient display, a plurality of different medical images are displayed with regard to one person and therefore an examination date and examination type are assigned for each medical image. Further, the patient indication 602 comprising the patient ID, patient name, sex and date of birth is displayed at the uppermost part of the screen.

The layout-type change buttons 604, priority change button 605, priority confirmation area 606, layout-type store button 607 and storage-mode change button 608 are similar to the layout-type change button 504, priority change button 505, priority confirmation area 506, layout-type store button 507 and storage-mode change button 508 of FIG. 5 and need not be described again.

Figure 7:
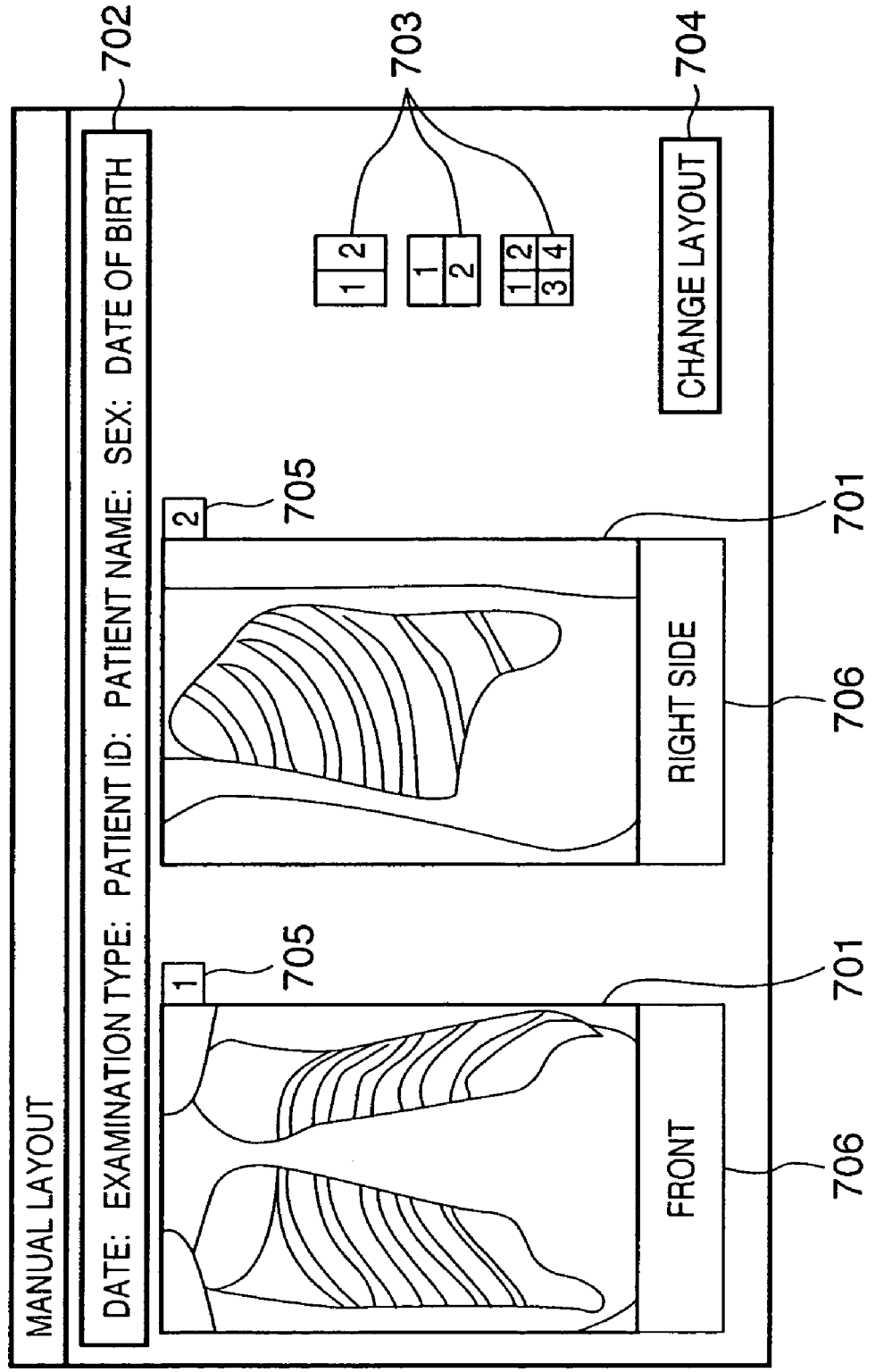
FIG. 7 is a front view illustrating a manual-layout screen in the medical image display apparatus shown in FIG. 2.

FIG. 7 is a front view illustrating a manual layout screen in the medical image display apparatus shown in FIG. 2. The manual layout screen of FIG. 7 is displayed when the manual layout button 406 is pressed in FIG. 4.

The title "MANUAL LAYOUT" is displayed at the uppermost part of the manual display screen, which is further provided with medical images 701, an indication 702 of examination date, examination type and patient, layout-type change buttons 703 and a layout change button 704.

Buttons for two horizontally disposed images, two vertically disposed images and four images are displayed as the layout-type change buttons 703, and the image positions on each of the buttons are assigned image numbers.

The medical images 701 are furnished with number display boxes 705, which display numbers corresponding to the image numbers of the layout-type change buttons 703, and image names 706. By changing the numbers in the number display boxes 705, the reader (observer) can change the images displayed at these positions. A number can be changed through a method such as clicking the number by a pointing device such as a mouse to establish the input mode and then entering the new value from a keyboard. A new layout type is generated by changing all images to numbers exhibiting consistency and performing a confirmation operation such as pressing the layout change button 704. As a result, the layout of images in the same layout type can be changed freely and the preference of the reader (observer) can be generated directly.

Figure 8:
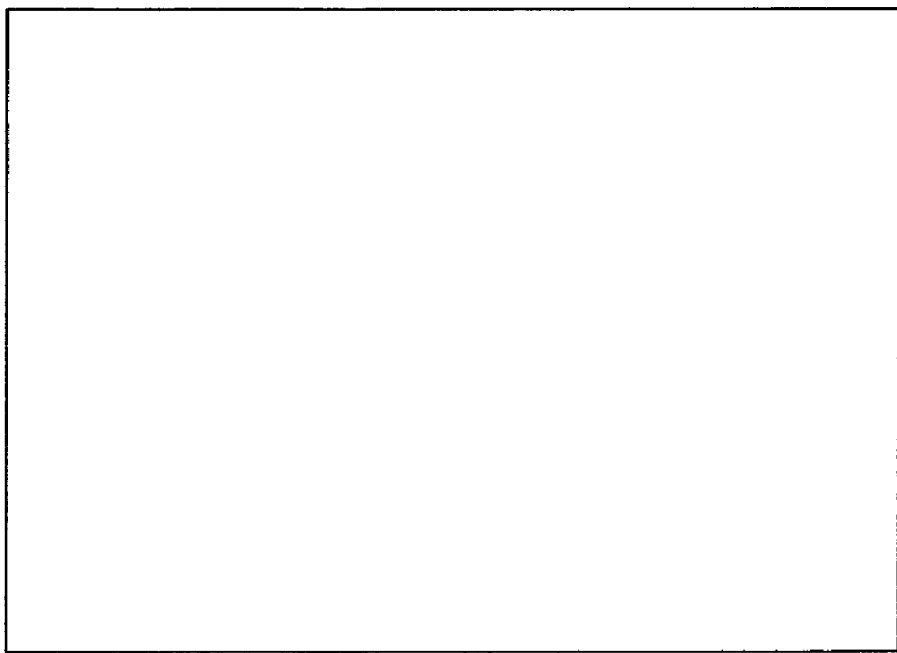
FIG. 8 is a front view illustrating a layout type of one image on the screens of FIGS. 5 to 7.

FIG. 8 is a front view illustrating a layout type of one image on the screens of FIGS. 5 to 7. With the layout type for displaying one image in FIG. 8, a single medical image 801 is displayed over substantially the entire screen and the title is displayed at the top of the screen.

Figure 9:
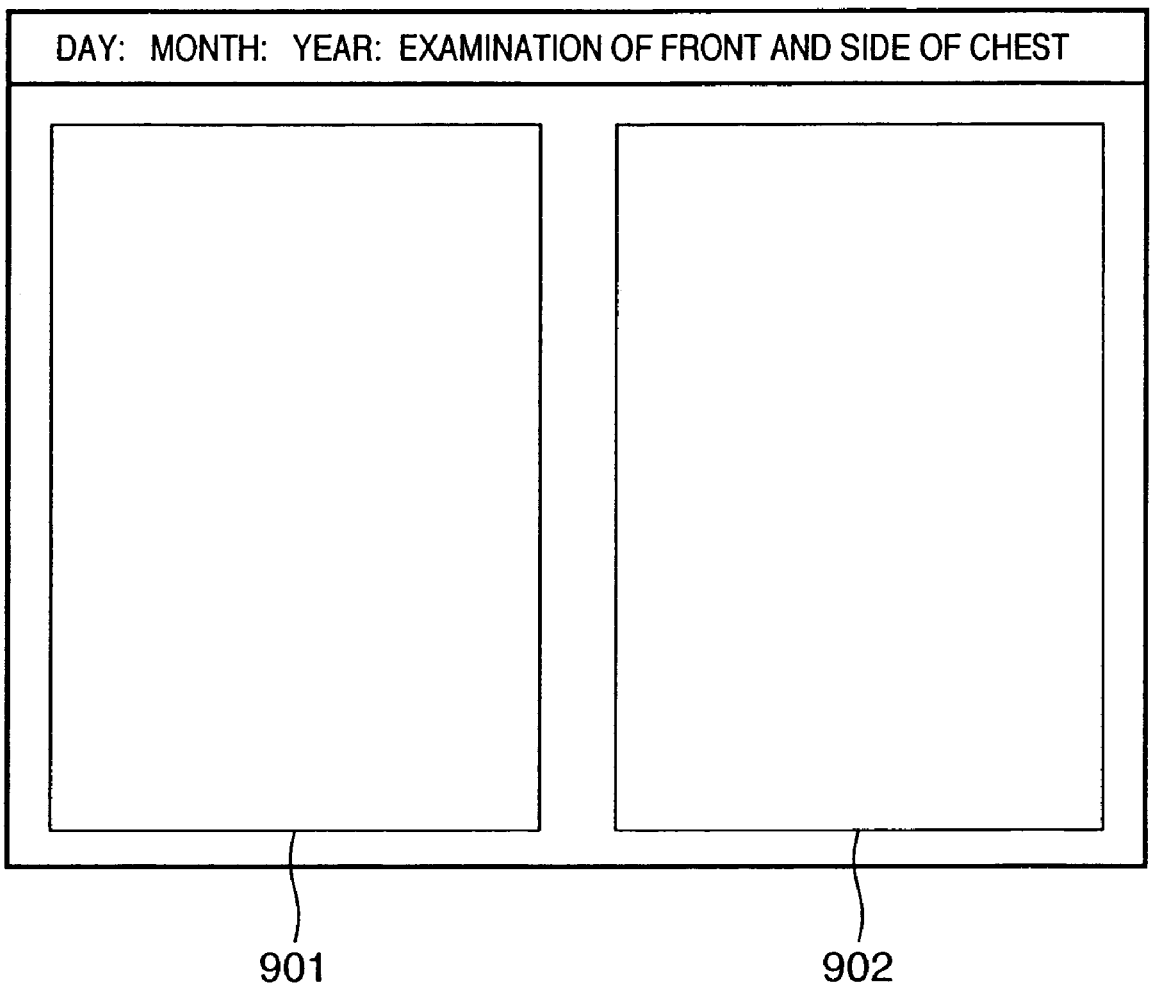
FIG. 9 is a front view illustrating a layout type of two images disposed horizontally on the screens of FIGS. 5 to 7.

FIG. 9 is a front view illustrating a layout type of two images disposed horizontally on the screens of FIGS. 5 to 7. With the layout type for displaying two horizontally disposed images in FIG. 9, two medical images 901, 902 are displayed horizontally side by side, as mentioned above, and the title is displayed at the top of the screen.

Figure 10:
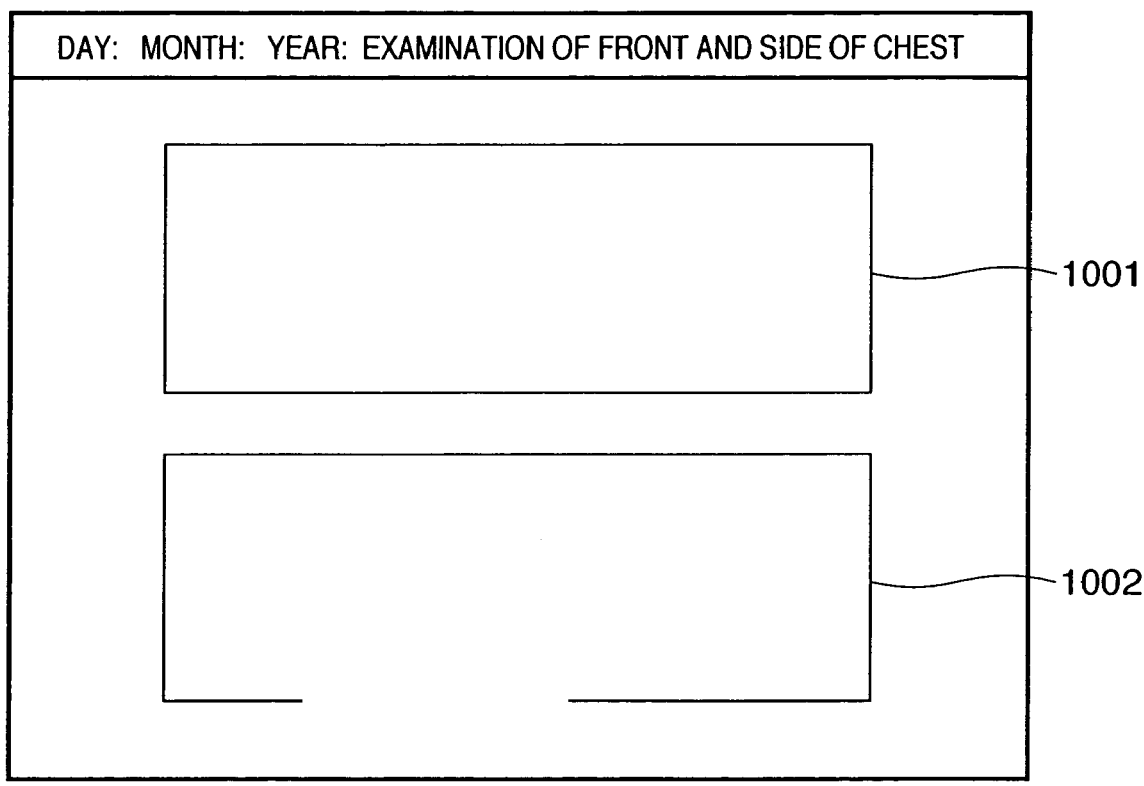
FIG. 10 is a front view illustrating a layout type of two images disposed vertically on the screens of FIGS. 5 to 7.

FIG. 10 is a front view illustrating a layout type of two images disposed vertically on the screens of FIGS. 5 to 7. With the layout type for displaying two horizontally disposed images in FIG. 10, two medical images 1001, 1002 are displayed vertically one above the other and the title is displayed at the top of the screen.

Figure 11:
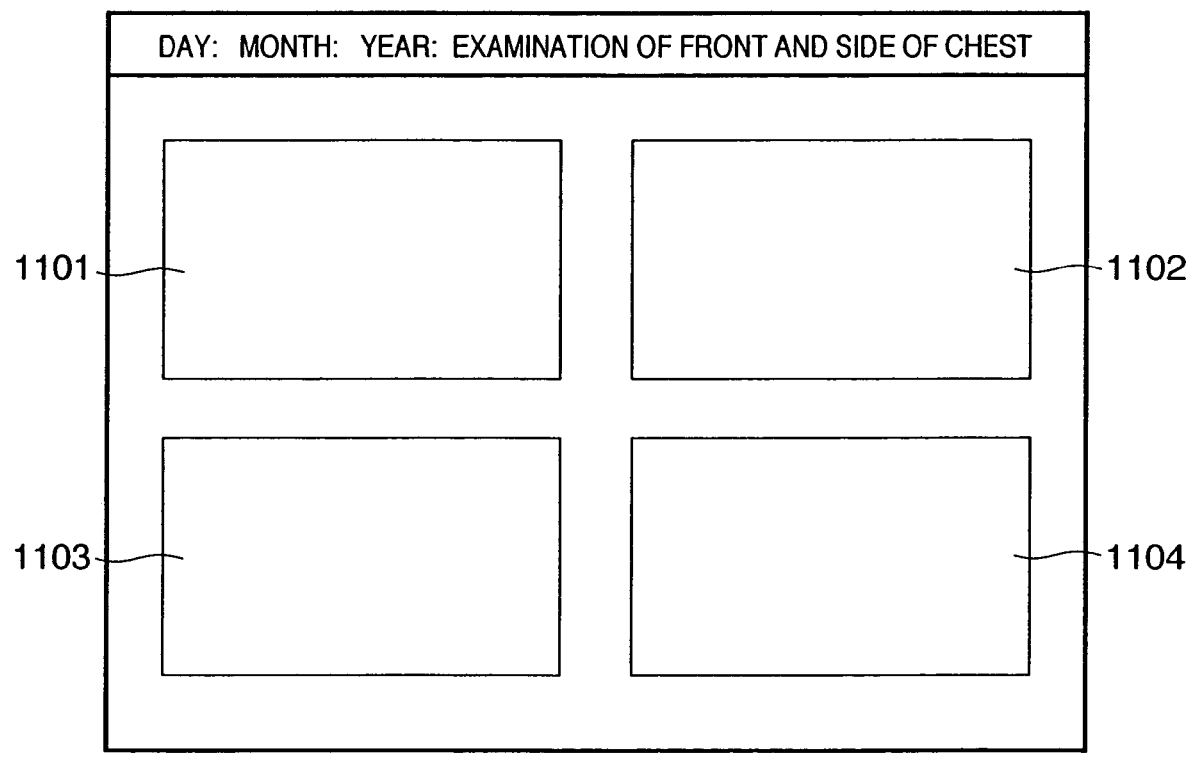
FIG. 11 is a front view illustrating layout type of four images on the screens of FIGS. 5 to 7.

FIG. 11 is a front view illustrating layout type of four images on the screens of FIGS. 5 to 7. With the layout type for displaying four images in FIG. 11, four medical images 1101 to 1104 are displayed with two images 1101, 1102 disposed above two other images 1103, 1104, respectively.

Figure 17:
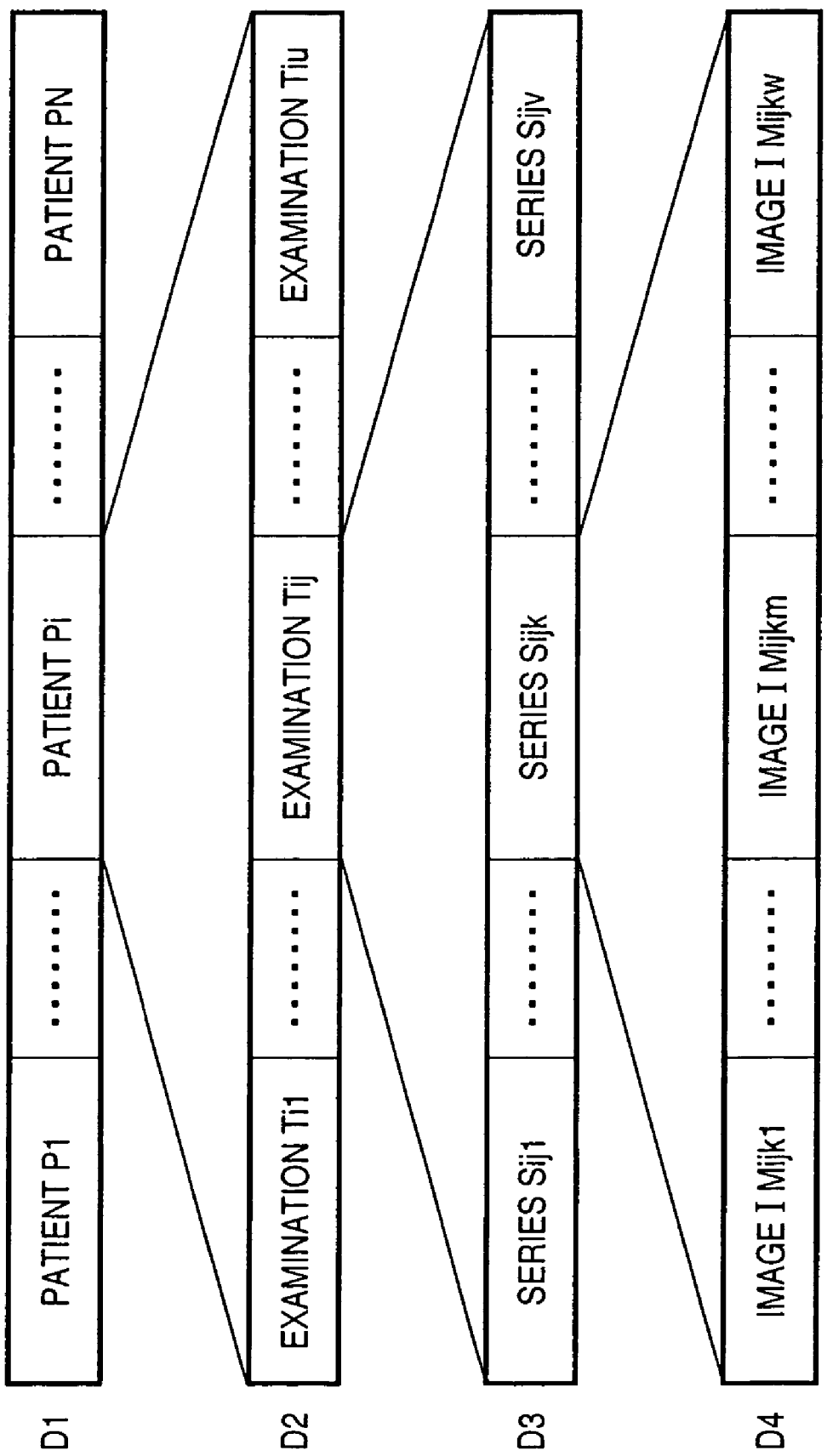
FIG. 17 is a conceptual view illustrating the data structure of medical data in the medical image display apparatus shown in FIG. 2.

FIG. 17 is a conceptual view illustrating the data structure of medical data in the medical image display apparatus shown in FIG. 2. The medical image display apparatus 110 manages medical data that is based upon the DICOM standard. The medical data comprises four layers, namely patient data (data indicative of the person undergoing diagnosis) D1, examination data D2, series data D3 and medical image data D4. One or multiple items of examination data (Ti1 to Tiu) correspond to each item of patient data (e.g., patient Pi), one or multiple items of examination data (Sij1 to Sijv) correspond to each item of examination data (e.g., examination Tij), and one or multiple items of medical image data (IMijk1 to IMijkw) correspond to each item of series data (e.g., examination Sijk). Each item of examination data comprises diagnostic results, etc., for every periodic physical examination, and results of interpretation are included in the examination data (Ti1 to Tiu). The series data includes results of different tests such as of the chest and abdomen performed in a single examination. One or a plurality of images correspond to each item of series data.

An embodiment of a medical image display method executed in the medical image display apparatus 110 will now be described with reference to FIGS. 12 to 16.

Figure 12:
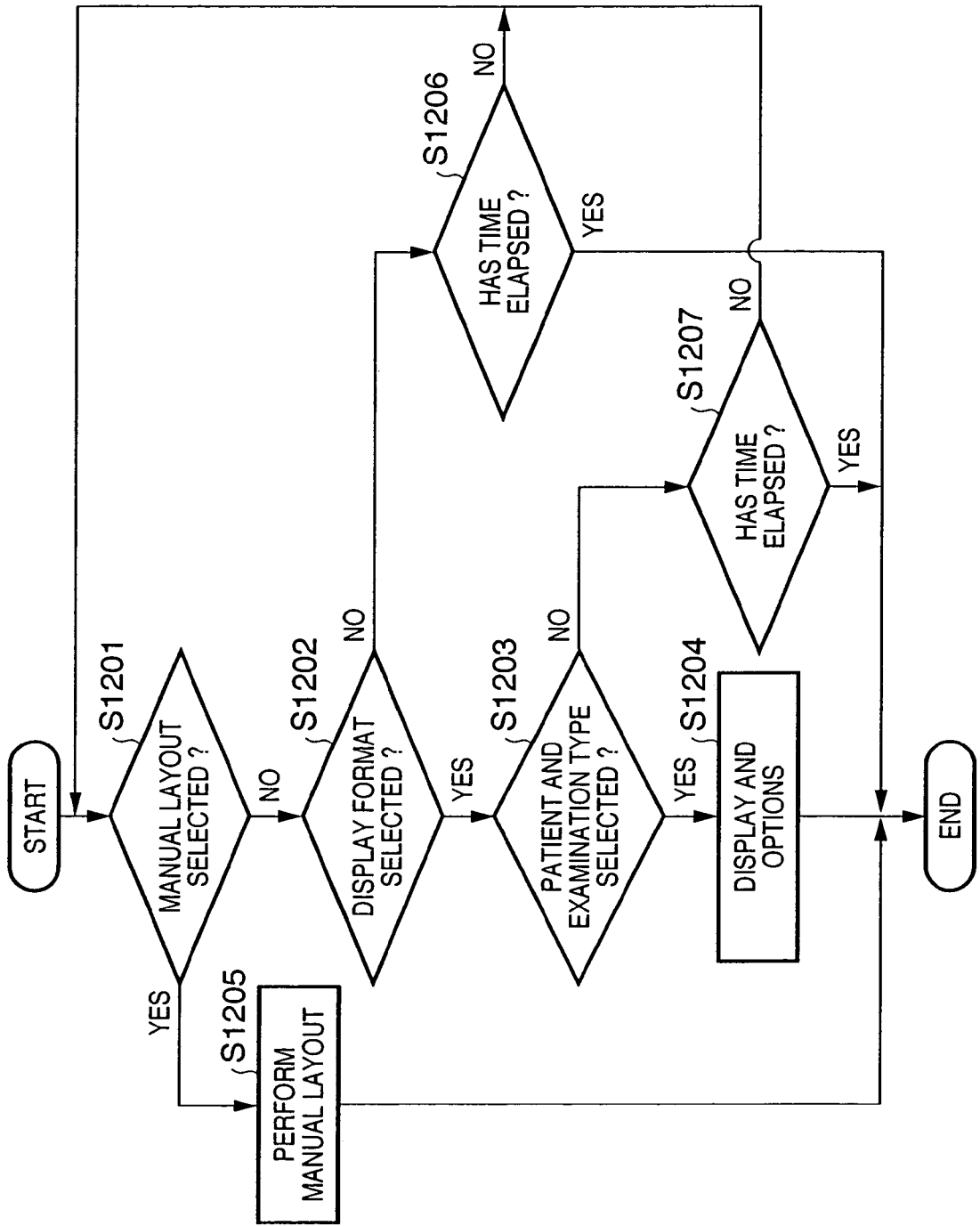
FIG. 12 is a flowchart illustrating a medical image display method executed by the medical image display apparatus shown in FIG. 2.

FIG. 12 is a flowchart illustrating a medical image display method executed by the medical image display apparatus shown in FIG. 2.

The medical image display method shown in the flowchart of FIG. 12 is as follows:

Step S1201: It is determined whether "MANUAL LAYOUT" on the display setting screen of FIG. 4 has been selected. If the manual layout has been selected, manual layout processing (the manual layout screen of FIG. 7) is executed at step S1205. If the manual layout has not been selected, control proceeds to step S1202.

Step S1202: It is determined whether a display format selection (transition to the patient-by-patient display) on the display setting screen of FIG. 4 has been made. If a transition has been made to the patient-by-patient display, control proceeds to step S1203. If a transition has not been made to the patient-by-patient display, control proceeds to step S1206.

Step S1203: It is determined whether selection of a patient and examination type has been selected in response to a transition to the patient-by-patient display. If selection of a patient and examination type has been made, control proceeds to step S1204. If selection of a patient and examination type has not been made, control proceeds to step S1207.

Figure 13:
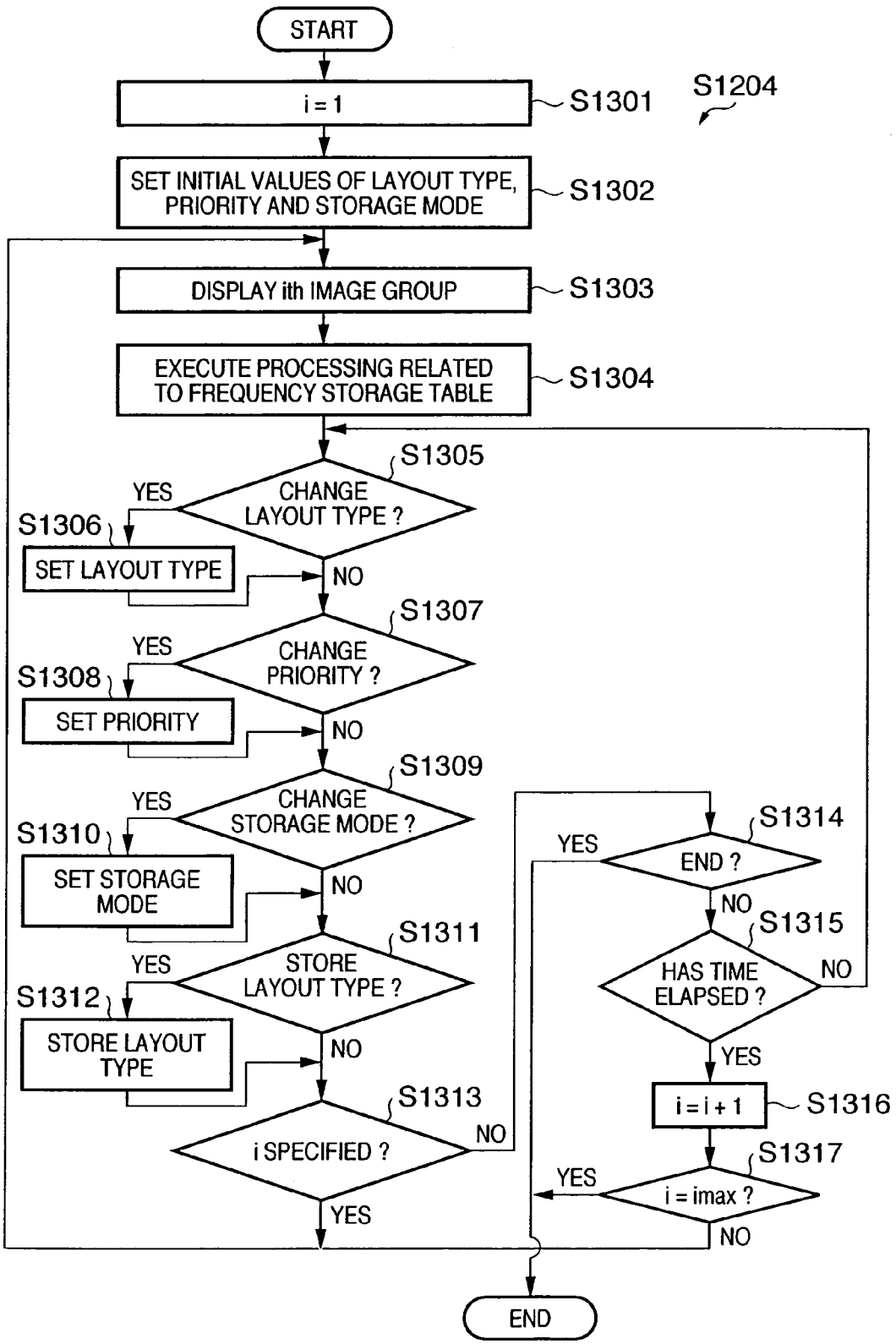
FIG. 13 is a flowchart illustrating processing of a display and option processing step in FIG. 12.

Step S1204: Display and option processing is executed. The details are illustrated in FIG. 13.

Step S1205: Processing for the manual layout is executed.

Step S1206: It is determined whether waiting time for input on the display setting screen has elapsed. If waiting time has not elapsed, control returns to step S1201. If waiting time has elapsed, processing is exited.

Step S1207: It is determined whether waiting time for input on the display setting screen has elapsed. If waiting time has not elapsed, control returns to step S1201. If waiting time has elapsed, processing is exited.

FIG. 13 is a flowchart illustrating processing of a display and option processing step in FIG. 12. The content of manual processing shown in the flowchart of FIG. 13 is as follows:

Step S1301: An image group number (represented by "i") of medical images to be displayed in the manual layout is initialized to "1" and control proceeds to step S1302.

Step S1302: Initial values of layout type, priority and storage mode are set.

Step S1303: The "i"the group of medical images is displayed.

Figure 14:
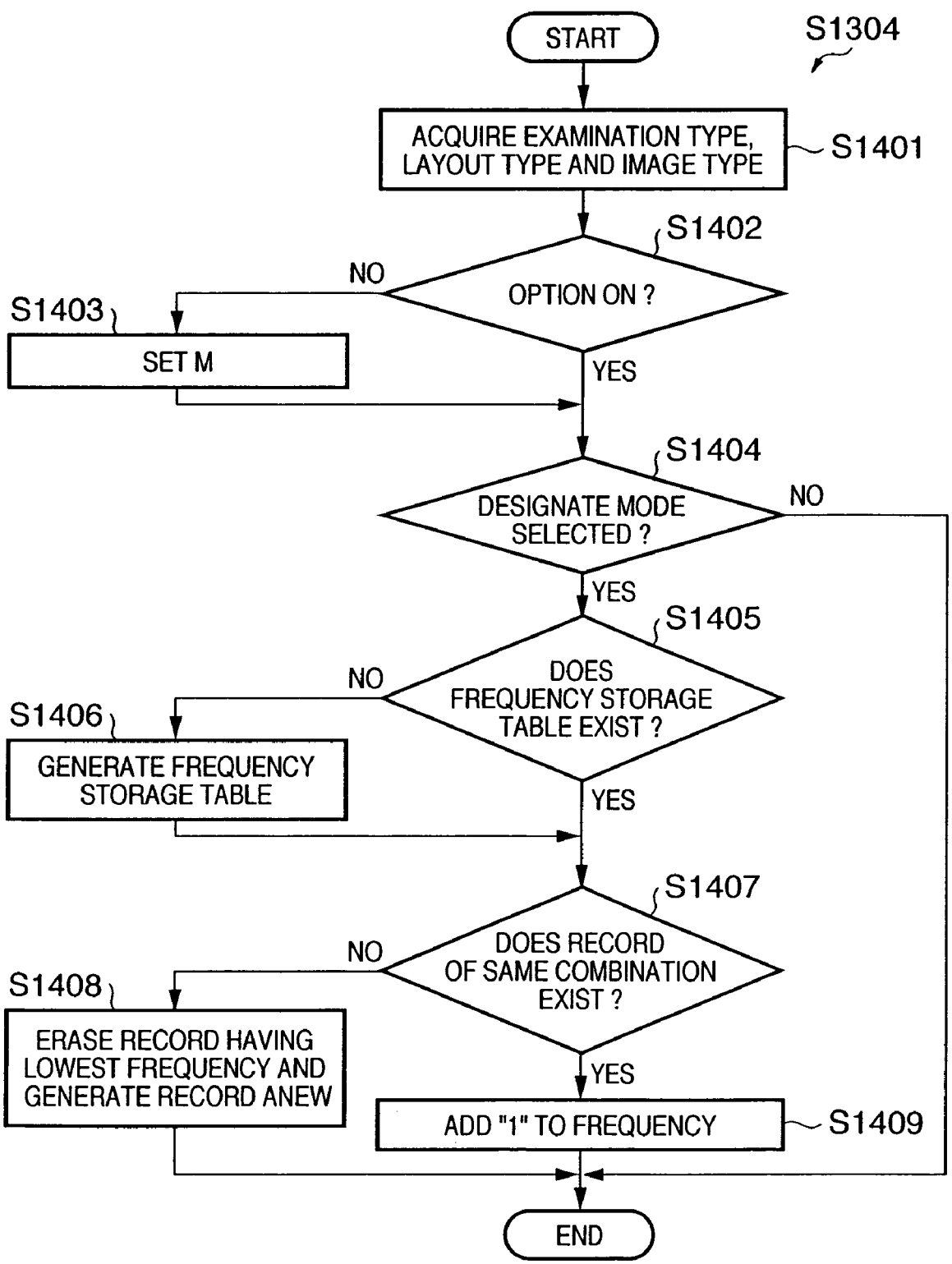
FIG. 14 is a flowchart illustrating processing relating to a frequency storage table processing step in FIG. 13.

Step S1304: Processing relating to the frequency storage table is executed and control proceeds to step S1305. The details of processing relating to the frequency storage table are shown in FIG. 14.

Step S1305: It is determined whether a change has been made to layout type in FIGS. 5 and 6. If a change in layout type has been made, control proceeds to step S1306. If a change has not been made, control proceeds to step S1307.

Step S1306: Processing for changing the layout type is executed and control proceeds to step S1307.

Step S1307: It is determined whether a change has been made to priority in FIGS. 5 and 6. If a change in priority has been made, control proceeds to step S1308. If a change has not been made, control proceeds to step S1309.

Step S1308: Processing for changing priority is executed and control proceeds to step S1309.

Step S1309: It is determined whether a change has been made to storage mode in FIGS. 5 and 6. If a change in storage mode has been made, control proceeds to step S1310. If a change has not been made, control proceeds to step S1311.

Step S1310: Processing for changing storage mode is executed and control proceeds to step S1311.

Step S1311: It is determined whether the layout-type store button 507 of FIGS. 5 and 6 has been clicked. If the button 507 has been clicked, control proceeds to step S1312. If the button has not been clicked, control proceeds to step S1313.

Step S1312: Processing for storing the layout type is executed and control proceeds to step S1313. That is, the layout type of medical images currently being displayed is added to the frequency at step S1312.

Step S1313: It is determined whether an image group number has been specified. Control returns to step S1303 if the image group number has been specified and proceeds to step S1314 if this number has not been specified.

Step S1314: It is determined whether end of processing has been selected. Processing is exited if end of processing has been selected and control proceeds to step S1315 if processing end has not been selected.

Step S1315: It is determined whether standby time for display and option processing has elapsed. If the standby time has elapsed, processing is exited. If the standby time has not elapsed, control proceeds to step S1316.

Step S1316: The number of the image group displayed is incremented and control proceeds to step S1316.

Step S1317: Processing is exited if display of all image groups has been completed, and control returns to step S1303 if a group of images to be displayed remains.

FIG. 14 is a flowchart illustrating processing relating to the frequency storage table processing step in FIG. 13. The content of processing of the flowchart of FIG. 14 relating to the frequency storage table is as follows:

Step S1401: Examination type, layout type and image type of a medical image are acquired at a predetermined timing and then control proceeds to step S1402. By exiting this step, addition of a new record to the frequency storage table at step S1408 below or frequency addition in the frequency storage table at step S1409 below is executed. The timings of frequency update are as described in connection with the storage mode specifying area 405, namely the four above-mentioned mode, i.e., the start mode, start/change mode, end mode and designate mode.

Step S1402: It is determined whether an option for setting the maximum value (M) of number of frequency ranks has been turned on. Control proceeds to step S1403 when the option is ON and to step S1404 when the option is not ON (i.e., when the option is OFF).

Step S1403: The reader (observer) is capable of setting a maximum value M (the denominator of the priority in FIGS. 5 and 6) on the number of frequency ranks when evaluating the frequency storage table (FIG. 15). If processing for setting M (setting M or exiting processing without setting M) is terminated, control proceeds to step S1404. In the evaluation of frequency rank, a record having a rank greater than M is ignored. Further, if M=1 has been set, the frequency ranks of all layout types are treated as being equal and the layout of the record used last is adopted.

Step S1404: It is determined whether the mode is the designate mode. Control proceeds to step S1405 if the mode is the designate mode and processing is exited if the mode is not the designate mode.

Step S1405: It is determined whether a frequency storage table relating to the layout type of the displayed medical images exists. At the moment this system starts being used, a frequency storage table per se does not exist and a table is created as necessary. Control proceeds to step S1407 if a frequency storage table exists and to step S1406 if a frequency storage table does not exist. That is, according to this embodiment, control proceeds to step S1406 when the system is used the first time or when the system is used anew following deletion of a table for some reason. In another mode of processing, it is of course permissible to prepare, from the start, a frequency storage table having information relating to all layout types. (In such case steps S1405 and S1406 need not be taken into consideration.)

Step S1406: A frequency storage table is generated anew and control proceeds to step S1407.

Step S1407: It is determined whether a record of the same combination in the same layout type exists. Control proceeds to step S1409 if a record of the same combination exists and to step S1408 if such a record does not exist.

Step S1408: If a record of the same combination does not exist, the record having the lowest frequency of use is erased and a record is added on anew. The frequency of use of the new record is made "1". Moreover, when there are plural records having the same frequency, the record which has been found last may be eliminated, or the oldest record may be eliminated based on information of date on which each record was updated last.

Step S1409: Here "1" is added to the frequency of use to raise the priority. The frequency of use is the reader (observer) examination type.

FIG. 15 illustrates the frequency storage table. In FIG. 15, a layout type of two horizontally disposed images or two vertically disposed images is used in the examination type "EXAMINATION OF FRONT AND SIDE OF CHEST", by way of example. With regard to the image positions in each layout type, there are two types of layouts for the front and sides of the chest. In the case of two horizontally disposed images, the position on the left is referred to as position 1 and that on the right as position 2. In the case of two vertically disposed images, the upper position is referred to as position 1 and the lower position as position 2. Which images are disposed at these positions are counted as a record. In the case of four images, the positions at the upper left, upper right, lower left and lower right are referred to as positions 1, 2, 3 and 4, respectively. In the case of one image, only position 1 exists. In the initial state, each of the image groups is disposed at positions 1, 2 or positions 1 to 4 in the order in which the images were generated.

In the frequency storage table of FIG. 15, a record in which there are two horizontally disposed images and the side of the chest is disposed at position 1 has been recorded ten times, a record in which there are two horizontally disposed images and the front of the chest is disposed at position 1 has been recorded 12 times, a record in which there are two vertically disposed images and the front of the chest is disposed at position 1 has been recorded two times, and a record of one image has been recorded three times. On the basis of this information, the record in which there are two horizontally disposed images and the front of the chest is disposed at position 1 has a frequency ranking of "1", the record in which there are two horizontally disposed images and the side of the chest is disposed at position 1 has a frequency ranking of "2", the record of one image has a frequency ranking of "3", and the record in which there are two vertically disposed images and the front of the chest is disposed at position 1 has a frequency ranking of "4".

Frequencies of use of layout types and records that have been selected by each of the readers (observers) (indicated by A, B and C) are recorded in the frequency storage table and the rank of a frequency of use regarding each reader (observer) can be calculated. In a case where a reader (observer) has been specified, therefore, an image layout in line with the preference of this reader (observer) can be selected immediately.

Furthermore, the image layout used last by each reader (observer) is recorded as final use in the frequency storage table under the name of the reader (observer), and the last image layout regarding all readers (observers) is recorded in the table as a symbol (e.g., a "○" symbol). If the storage mode is the end mode, it is possible to select either the record that prevailed when the M=1 setting was made without specifying the reader (observer), or the record that prevailed when the M=1 setting was made upon specifying the reader (observer).

If the priority 1/4 is selected on the screen of FIG. 5 that displays the examination type, images will be displayed in the layout of the record of frequency ranking "1". If the priority 2/4 is selected, images will be displayed in the layout of the record of frequency ranking "2". It should be noted that the denominator "4" is the maximum value M of frequency ranks for which priority is to be evaluated.

Medical images of a plurality of examination types are displayed on the patient-by-patient display screen of FIG. 6. On the other hand, medical images have their frequencies of use stored according to type of examination. Accordingly, the image layout having the highest frequency of use is selected from among image layouts of all examination types to be displayed.

Figure 16:
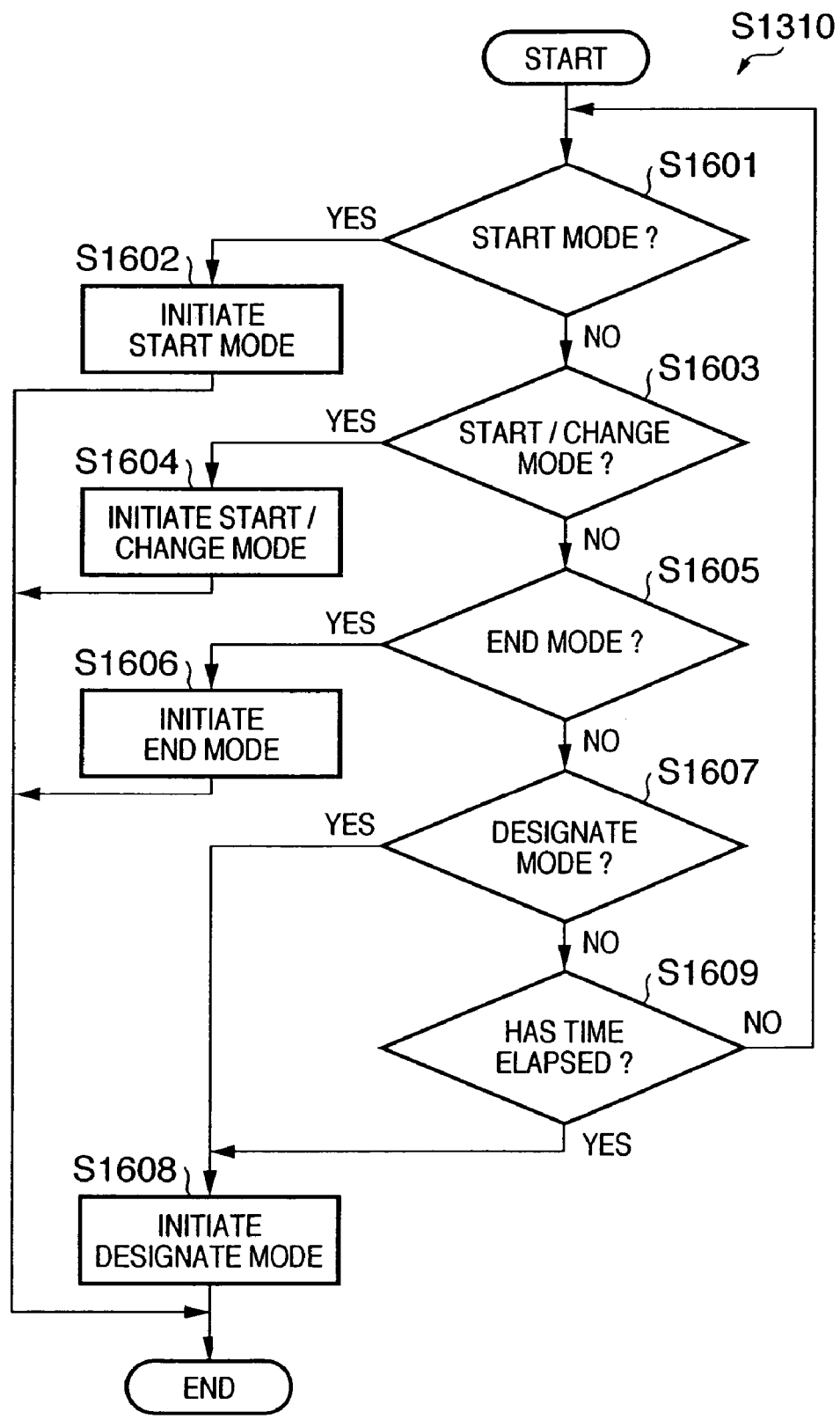
FIG. 16 is a flowchart illustrating processing of a storage mode setting processing step in FIG. 13.

FIG. 16 is a flowchart illustrating processing of the storage mode setting processing step in FIG. 13. The processing shown in the flowchart of FIG. 16 for setting the storage mode is as follows:

Step S1601: It is determined whether the start mode has been selected. Control proceeds to step S1602 if the start mode has been selected and to step S1603 if the start mode has not been selected.

Step S1602: The start mode is initiated and processing is exited.

Step S1603: It is determined whether the start/change mode has been selected. Control proceeds to step S1604 if the start/change mode has been selected and to step S1605 if the start/change mode has not been selected.

Step S1604: The start/change mode is initiated and processing is exited.

Step S1605: It is determined whether the end mode has been selected. Control proceeds to step S1606 if the end mode has been selected and to step S1607 if the end mode has not been selected.

Step S1606: The end mode is initiated and processing is exited.

Step S1607: It is determined whether the designate mode has been selected. Control proceeds to step S1608 if the designate mode has been selected and to step S1609 if the designate mode has not been selected.

Step S1608: The designate mode is initiated and processing is exited.

Step S1609: It is determined whether waiting time for setting of the storage mode has elapsed. Processing is exited directly if waiting time has elapsed. If waiting time has not elapsed, control returns to step S1501.

[Program]

A program for executing the first embodiment of the medical image display method includes program code for executing the steps S1201 to S1207 in FIG. 12, steps S1301 to S1317 in FIG. 13, steps S1401 to S1407 in FIG. 14 and steps S1601 to S1609 in FIG. 16.

[Storage Medium]

The medical image display method according to the present invention can be implemented by an apparatus other than the medical image display apparatus of FIGS. 2 to 3, e.g., by a general-purpose computer. In such case a control program provided by a storage medium or the like may be set in an external storage device of the general-purpose computer and the program may be executed by a CPU in response to a command from an operator or the like.

[Second Embodiment]

Figure 18:
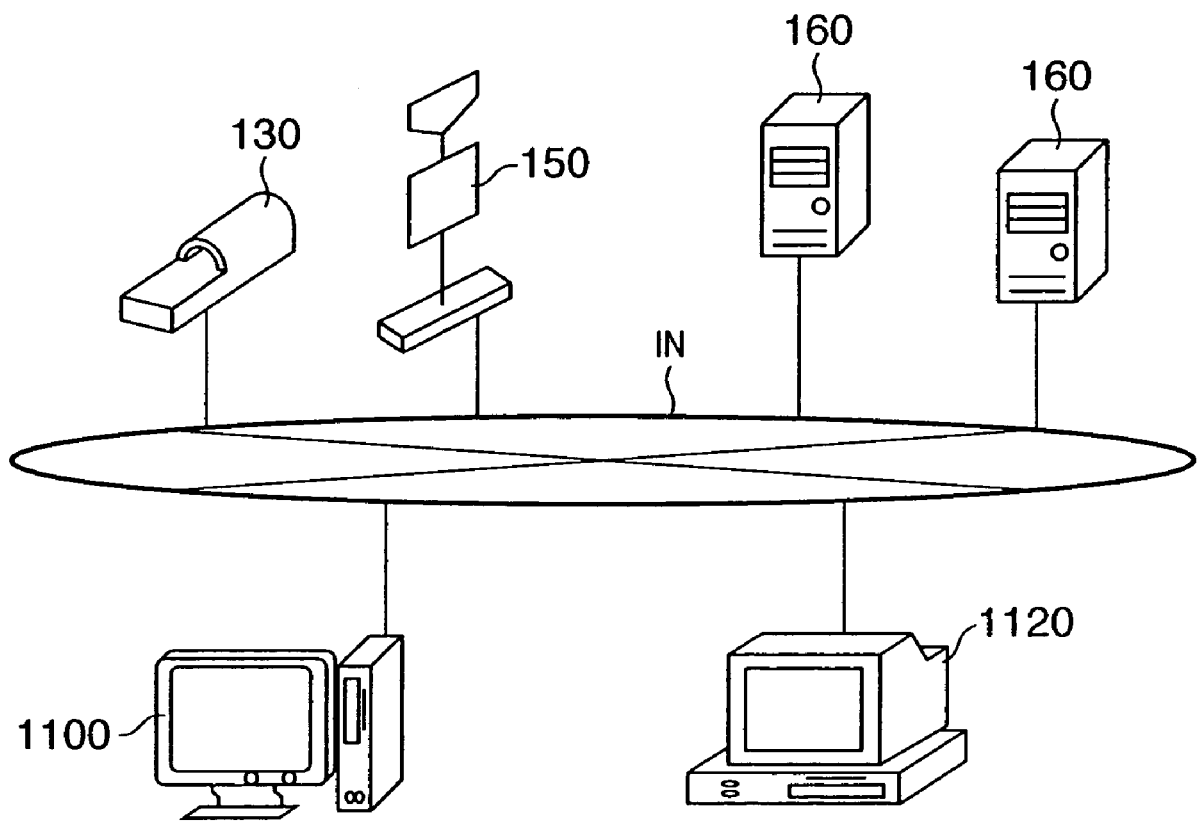
FIG. 18 is a diagram illustrating a second embodiment of a medical image display apparatus according to the present invention.

FIG. 18 is a diagram illustrating a second embodiment of a medical image display apparatus according to the present invention. Components identical with or corresponding to those of the first embodiment (FIG. 1) are designated by like reference characters and need not be described again.

Medical image display apparatus 1110, 1120 in FIG. 18 are connected to medical image generating units 1130, 1140 and medical data servers 1150, 1160 via communication means such as the Internet IN.

If the equipment is connected in this manner via communication means, it is possible to display medical images generated remotely. In addition, medical data can be archived and managed at another facility.

The medical data servers 1150, 1160 have a variety of applications. They can archive individually the medical data of individual patients or can partition and archive medical data regarding the same patient. A relational database is effective for use in the decentralized retention and management of the medical data.

In accordance with this embodiment, the operation involved in setting an image display layout is facilitated and it is possible to reflect the preferences of the observer in the layout.

The present invention is not limited to the above embodiments, especially medical images, and various changes and modification can be made within the spirit and scope of the present invention. Therefore, to apprise the public of the scope of the present invention, the following claims are made.

What is claimed is:

1. An image display method for displaying a plurality of images in one of image layout formats of a plurality of types, comprising:

a frequency storage step of storing, for a medical examination, frequency of use for each of the image layout formats used in the medical examination, wherein each of the image layout formats includes a plurality of image display positions and types of medical images to be displayed at the plurality of image display positions;

a first setting step of setting a type of medical examination;

a second setting step of setting one of the image layout formats based upon frequencies of use corresponding to a medical examination having a type set in the first setting step, that have been stored; and a display step of displaying each medical image whose type is included in the image layout format set in the second setting step, at each image display position included in the image layout format set in the second setting step on a display.

2. The method according to claim 1, wherein said frequency storage step stores the frequency of use in association with each of a plurality of observers, and said second setting step sets the one of the image layout formats based upon the frequencies of use and an observer.

3. The method according to claim 1, wherein said second setting step sets, for every observer, an image layout format having the highest frequency of use as an image layout format used to display the plurality of images.

4. The method according to claim 1, wherein the frequency of use of an image layout format is updated at a timing at which the plurality of images is displayed in the image layout format.

5. The method according to claim 1, wherein the frequency of use of an image layout format is updated at a timing at which the image layout format is changed.

6. The method according to claim 1, wherein the frequency of use of an image layout format, which is used in displaying the plurality of images, is updated at a timing at which said display step ends.

7. The method according to claim 1, wherein the frequency of use of an image layout format, which is used in displaying the plurality of images, is updated at a timing at which an observer performs an operation for updating the frequency of use.

8. The method according to claim 1, wherein said frequency storage step stores collectively the frequencies of use of the image layout formats, which have been used for displaying the plurality of images for a plurality of observers, without distinguishing among the plurality of observers.

9. The method according to claim 1, wherein the plurality of images are medical images and a combination of images of a plurality of different types of examination, and said second setting step sets an image layout format based upon the frequency of use corresponding to a type of examination of the plurality of images.

10. The method according to claim 1, further comprising:
a maximum value setting step of setting a maximum value of the ranks of frequencies of use capable of being stored; and an exclusion step of excluding the image layout format having the lowest frequency of use when the total number of frequencies of use exceeds the maximum value set in the maximum value setting step by adding a frequency of use of a new image layout format.

11. The method according to claim 10, wherein when the maximum value is set to one, the ranks of the frequency of all image layout formats are treated as equal.

12. The method according to claim 1, further comprising a layout format display step of displaying a display of image layout formats for notifying of the one of the image layout formats that has currently been set.

13. The method according to claim 12, further comprising an image layout format change step of changing the image layout format of the images currently being displayed on the display.

14. The method according to claim 13, wherein the display of image layout formats is changed in response to an operation for changing the image layout format.

15. An image display apparatus comprising:
a display for displaying images;
a layout storage unit for storing a plurality of image layout formats used in a medical examination, wherein each of the plurality of image layout formats includes a plurality of image display positions and types of medical images to be displayed at the plurality of image display positions;
a medical examination setting unit for setting a type of medical examination;
a layout setting unit for setting one of the plurality of image layout formats on said display;
a display control unit for controlling to display on the display each medical image whose type is included in the image layout format set by said layout setting unit, at each image display position included in the image layout format set by the layout setting unit; and
a frequency storage unit for storing, for the medical examination, frequency of use for each of the plurality of image layout formats,
wherein said layout setting unit sets an image layout format based upon frequencies of use corresponding to a medical examination having a type set by the medical examination setting unit.

16. A computer-executable program stored on a computer-readable medium having program code for causing a computer to execute an image display method for displaying a plurality of images in one of image layout formats of a plurality of types, said program comprising:
code for implementing a frequency storage step of storing, for a medical examination, frequency of use for each of the image layout formats used in the medical examination, wherein each of the image layout formats includes a plurality of image display positions and types of medical images to be displayed at the plurality of image display positions;
code for implementing a first setting step of setting a type of medical examination;
code for implementing a second setting step of setting one of the image layout formats based upon frequencies of use corresponding to a medical examination having a type set in the first setting step, that have been stored; and
code for implementing a display step of displaying each medical image whose type is included in the image layout format set in the second setting step, at each image display position included in the image layout format set in the second setting step on a display.

17. The apparatus according to claim 15, wherein said layout setting unit further sets a plurality of buttons, each indicating one of the plurality of image layout formats, on said display.

18. The apparatus according to claim 17, further comprising a selection unit for selecting one of the plurality of buttons, wherein the image layout format used to display the images is changed in response to the selection by said selection unit.

* * * * *